March 1, 1966 N. R. GUILBERT, JR 3,237,789
UNLOADING APPARATUS FOR DUMB WAITERS AND THE LIKE
Filed Dec. 26, 1962
2 Sheets-Sheet 1
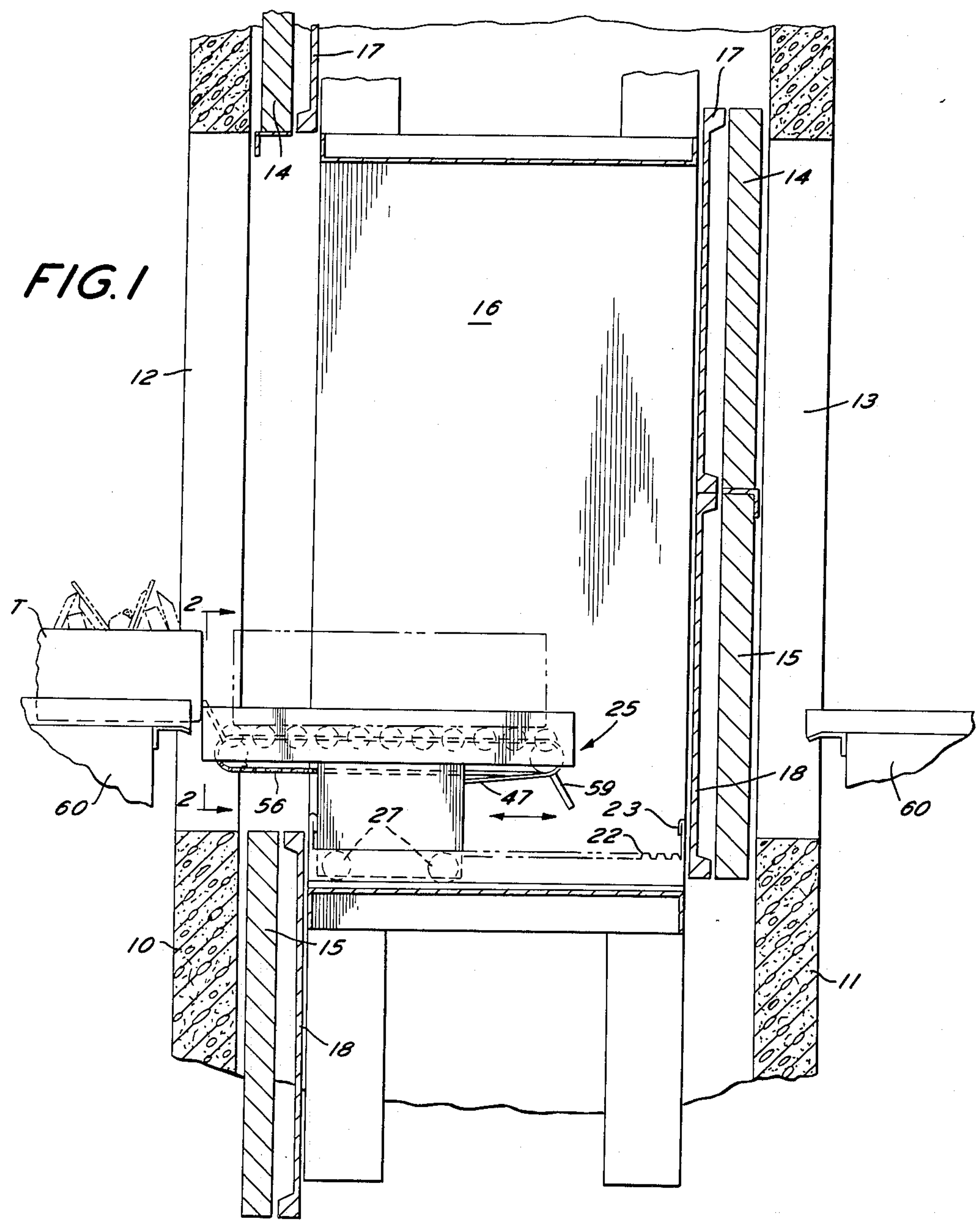
INVENTOR.
NICHOLAS R. GUILBERT, JR.
BY
ATTORNEY UNLOADING APPARATUS FOR DUMB WAITERS AND THE LIKE
Filed Dec. 26, 1962 2 Sheets-Sheet 2
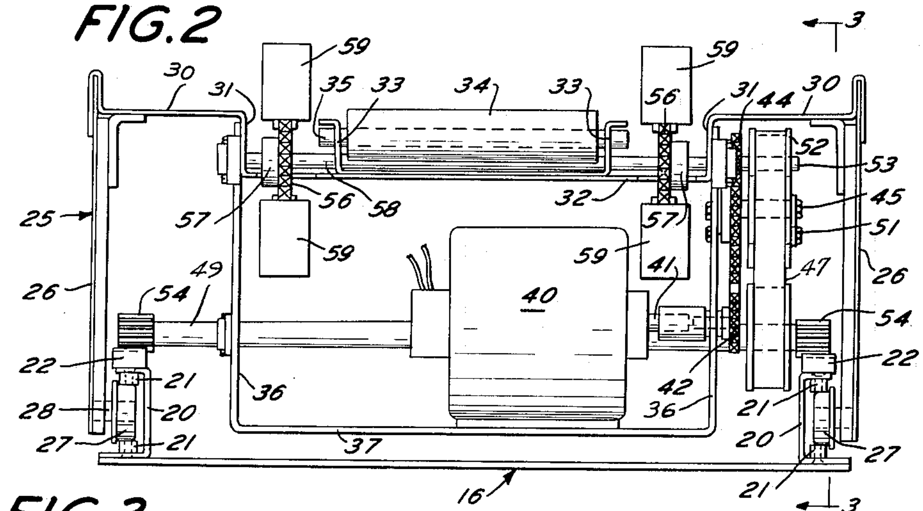
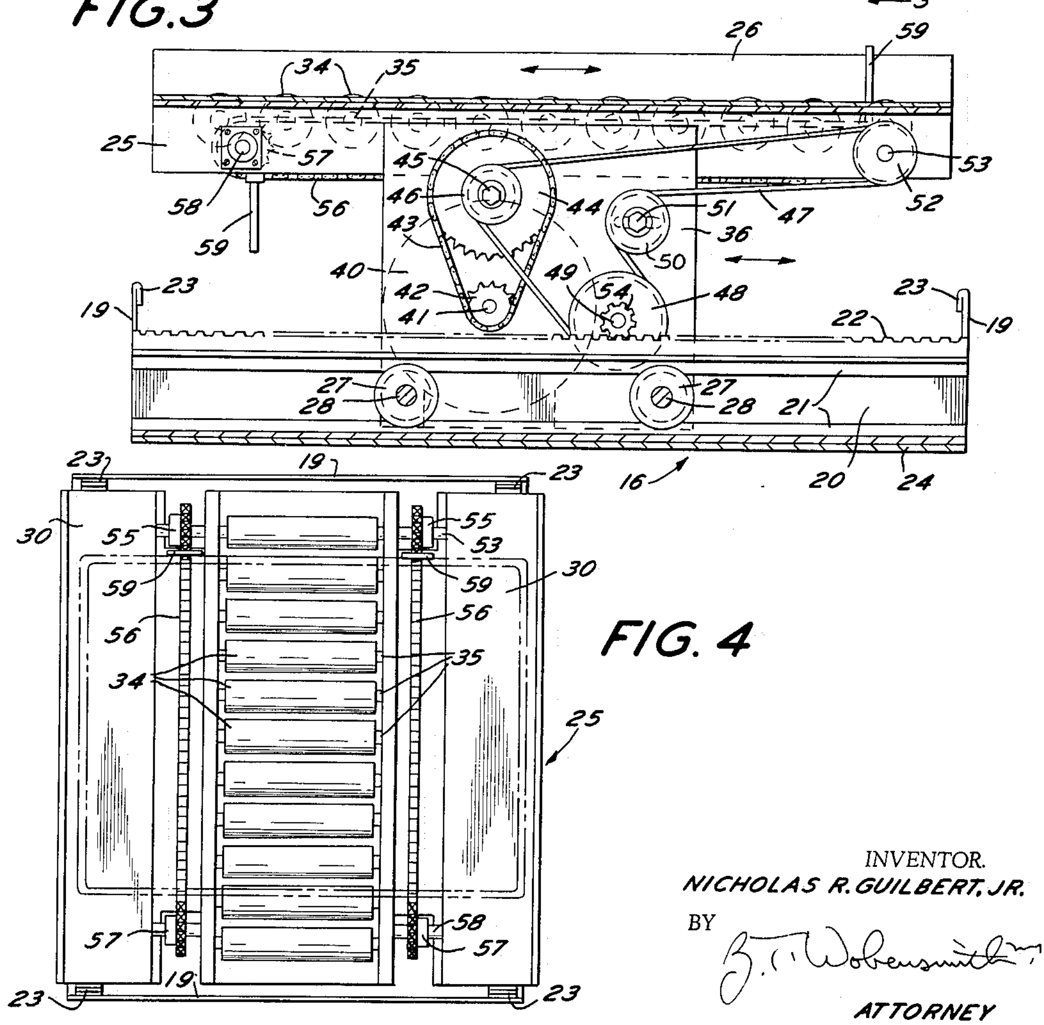
INVENTOR.
NICHOLAS R. GUILBERT, JR.
BY
[signature]
ATTORNEY

United States Patent Office 3,237,789

Patented Mar. 1, 1966

3,237,789

UNLOADING APPARATUS FOR DUMB WAITERS AND THE LIKE

Nicholas R. Guilbert, Jr., Glenside, Pa., assignor to Guilbert, Incorporated, Philadelphia, Pa., a corporation of Pennsylvania Filed Dec. 26, 1962, Ser. No. 246,895
10 Claims. (Cl. 214—95)

This invention relates to apparatus for unloading materials from dumb waiters and the like at designated landings.

Dumb waiter installations are employed for various purposes but have required personal attention particularly for unloading. The dumb waiter is not available for further use while waiting to be loaded and a waste of time of the attendant results during dumb waiter movement.

It is the principal object of the present invention to provide unloading apparatus for dumb waiters and the like with which quick and effective unloading can be effected.

It is a further object of the present invention to provide unloading apparatus for dumb waiters and the like with which quick and effective unloading can be carried out with due regard for the materials being unloaded.

It is a further object of the present invention to provide unloading apparatus for dumb waiters and the like which can be applied as new equipment or to existing installations of dumb waiters.

It is a further object of the present invention to provide unloading apparatus for dumb waiters or the like including a carriage and in which the apparatus in itself moves in part beyond the platform of the car to a location to bridge the gap between the car and a receiving location.

It is a further object of the present invention to provide unloading apparatus for dumb waiters and the like with which the article is delivered by a carriage without the necessity for lifting the same during the delivery by the carriage.

It is a further object of the present invention to provide unloading apparatus for dumb waiters and the like in which the article to be delivered is discharged onto a horizontal and level receiving table.

It is a further object of the present invention to provide an unloading device by which an automatic dumb waiter can be made effective for distributing materials of various types and kinds at their designated landings for storage or distribution.

It is a further object of the present invention to provide an unloading device which can operate in either direction, as desired, at a particular landing.

It is a further object of the present invention to provide a device of the character aforesaid which can be utilized for loading, if desired.

Other objects and advantageous features of the invention will be apparent from the description and claims.

The nature and characteristic features of the invention will be more readily understood from the following description taken in connection with the accompanying drawings forming part thereof, in which:

FIGURE 1 is a vertical sectional view through a dumbwaiter hatchway having a dumb waiter car therein with a preferred form of unloading apparatus in accordance with the invention;

FIG. 2 is a vertical sectional view taken approximately on the line 2—2 of FIG. 1;

FIG. 3 is a vertical sectional view taken approximately on the line 3—3 of FIG. 2; and FIG. 4 is a top plan view of the unloading apparatus shown in the preceding figures.

It should, of course be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated, the front and rear vertical walls 10 and 11 are shown with front and rear access openings 12 and 13 normally closed by upper and lower hatchway doors 14 and 15. A car 16 guided and movable along vertical rails (not shown) is provided and preferably has upper and lower doors 17 and 18.

The access openings 12 and 13 are typical of those provided at each level at which unloading or loading is to be effected.

The car 16 has a horizontal bottom floor 24 on which a supporting base is mounted. The base has vertical end frame plates 19 with spaced side channels 20 extending therebetween. The side channels have rails 21 and horizontal racks 22 and end stops 23 carried thereby.

A carirage 25 is provided for movement with respect to the car 16 for loading and unloading. The carriage 25 has opposite outer frame plates 26 with carriage supporting flanged rollers 27 on shafts 28 mounted on the frame plates 26. The rollers 27 ride in the rails 21.

The carriage 25 has opposite horizontal side floor sections 30 with downwardly extending flanges 31 and a central floor section 32 therebetween. The floor section 32 is provided with spaced vertical conveyor roll rails 33 which serve as supports for freely rotatable antifriction conveyor rolls 34 carried on shafts 35 which can be fixedly mounted in the rails 33.

Extending downwardly from the flanges 31 and the central floor section 32 opposite vertical side frame plates 36 are provided connected at the bottom by a horizontal plate 37.

The horizontal frame plate 37 has a reversible electric motor 40 mounted thereon with a motor shaft 41. The motor shaft 41 extends through one of the side frame plates 36 and has a sprocket 42 keyed thereto. The sprocket 42 is connected by a driving chain 43 to a sprocket 44 carried on a shaft 45 supported by one of the side frame plates 36. The shaft 45 has a pulley 46 secured thereto. A belt 47 engaging the pulley 46 extends over a pulley 48 on a shaft 49, around a tension adjusting pulley 50 on a shaft 51 and over a driving pulley 52 on a shaft 53.

The shaft 49 is journaled in the outer frame plates 26 and has pinions 54 in engagement with the racks 22.

The shaft 51 is adjustably mounted on the side frame plate 36 so that the belt tension can be adjusted as desired.

The shaft 53 is journaled in the flanges 31 and has driving sprockets 55 on each side with driving chains 56 in engagement therewith. The chains 56 at the opposite ends of the flanges 31 are carried on idler sprockets 57 mounted on a shaft 58.

The chains 56, at spaced locations, have pusher plates 59 carried thereby for impelling or pushing articles, such as trays T, along the conveyor rolls 34 as desired.

At each access opening 12 and 13 a table 60 is preferably provided to receive the articles to be delivered to the access opening and for the storage of articles, such as trays T, to be returned.

The mode of operation will now be pointed out.

With an article such as a tray T centrally located with respect to the carriage 25 and supported by the conveyor rolls 34 the car 16 is moved to the desired floor where the article is to be delivered. The car 16 will be positioned at an access opening 12 and/or 13. The specific hatchway doors 14 and 15 and car doors 17 and 18 at the selected access opening 12 or 13 will be opened in a well known manner.

As the car doors 17 and 18 open, and depending on which direction of delivery is desired, the electric motor 40 is energized to rotate the motor shaft 41. The sprocket 42 through the driving chain 43 and sprocket 44 drives the shaft 45.

Movement of the shaft is effective for driving the pulley 46 and the belt 47. The belt 47 by its engagement with the pulley 48 drives the shaft 49. The pinions 54 on the shaft 49 by their engagement with the racks 22 on each side provide the desired actuation. Movement of the carriage 25 in each direction can be limited by the stops 23.

As the carriage 25 is advanced the belt 47 by its engagement with the pulley 52 drives the shaft 53 and this is effective for advancing the pusher plates 59 on each side to move the article along the conveyor rolls 34. The positioning of the pusher plates 59 can be utilized for timing the advance of the article so that adequate bridging by the advance of the carriage 25 is effected to support the article.

Shut-off of the motor 40 can be accomplished in any desired manner.

It will be noted that the movement of the carriage 25 bridges the space to the table 60, and bumping over the top edges of the lower car door 18 and lower hatchway door 15 is avoided. At the same time, the predetermined elevation of the table 60 and the upper part of the carriage 25 permits of delivery of the articles to a convenient height for subsequent delivery.

The delivery in the desired direction is determined by the direction of rotation of the motor.

The carriage 26 can be retracted by reversing the motor 40 and as the carriage 25 returns to the central position in the car 16 the pusher plates 59 are returned to their initial positions. During the retraction of the carriage 25 and after it has moved out of the path of movement of the lower hatchway door, 15 and lower car door 18, the hatchway doors 14 and 15 and the car doors 17 and 18 can be closed and the car 16 moved to the desired location for reloading and the next delivery.

For return of articles, such as a tray T, the same is manually moved to the rollers 34 so as to be clear of the pusher plates 59.

I claim:

1. In combination with a car adapted for movement in a vertical hatchway having hatchway doors at hatchway access locations movable to open positions, an article transfer carriage having a plurality of article supporting sections for movement towards and away from a selected hatchway access location, said article supporting sections including a central longitudinally extending article engaging portion for article support, said article supporting section having at least one cantilever end movable outwardly beyond a hatchway door in open position, horizontal carriage supporting rails in said car, carriage supporting members movable along said rails, a motor on said carriage, spaced article impelling members mounted on said carriage on opposite sides of said central mounted article engaging portion for moving an article along said article engaging portion, carriage moving members on said carriage and said car having interengaging portions, and operating connections between said motor and said carriage moving members and said motor and said article impelling member, said carriage moving members moving said end portion outwardly beyond a hatchway door in open position.

2. The combination as defined in claim 1 in which said central article engaging portion is provided with antifriction rollers.

3. The combination defined in claim 1 in which said article engaging portion is provided with antifriction conveyor rollers and said article impelling members include pusher devices.

4. The combination defined in claim 1 in which said carriage supporting members include flanged rolls carried by shafts mounted on said carriage.

5. The combination defined in claim 1 in which said operating connections between said motor and said article impelling members and between said motor and said carriage moving members include a common driving element.

6. The combination defined in claim 1 in which said operating connections between said motor and said article impelling members and between said motor and said carriage moving members include a belt, a pulley with which said belt is in driving engagement, spaced sprockets on said carriage, a chain carried by said sprockets, and said article impelling members include article pusher devices carried by said chain and a driving connection between said pulley and one of said sprockets.

7. Article transfer apparatus for a car adapted for vertical movement comprising a carriage having a plurality of horizontally elongated article supporting sections extending substantially from one side to the other of said car, said article supporting sections including a central longitudinally extending article engaging portion for article support, said article supporting sections having at least one cantilever end movable outwardly beyond a hatchway door in open position, said carriage having a carriage frame beneath said article supporting sections, rails carried by said car, supporting wheels mounted on said frame and engaging said rails from movement of part of said article supporting sections outwardly beyond said car, spaced members on opposite sides of said central mounted article engaging portion movable longitudinally of said article engaging portion for moving an article therealong, a reversible motor member carried by said frame, an endless belt driven from said motor member, a first shaft carried by said frame, a first pulley on said shaft with which said belt is in driving engagement, a pinion secured to said shaft, and a rack on said car with which said pinion is in engagement for moving said carriage.

8. Article transfer apparatus for a car adapted for vertical movement comprising a carriage having a plurality of horizontally elongated article supporting sections extending substantially from one side to the other side of the car, said article supporting sections including a central longitudinally extending portion for article support, said article supporting sections having at least one cantilever end movable outwardly beyond a hatchway door in open position, said carriage having a carriage frame beneath said article supporting sections, rails carried by said car and extending from said one side to the other side of said car, wheels mounted on said carriage frame and engaging said rails for movement of part of said article supporting sections in projecting relation beyond one of said sides of said car, spaced pusher members on opposite sides of said central mounted longitudinally extending portion for moving an article therealong, a reversible motor member carried by said frame, an endless belt driven from said motor member, spaced shafts carried by said article supporting sections, sprockets on said shafts, a chain on said sprockets connected to one of said pusher members, a pulley with which said belt is in driving engagement, and a driving connection between said pulley and one of said sprockets.

9. In combination with a car adapted for vertical movement in a vertical hatchway having hatchway doors at hatchway access locations movable to open positions, an article transfer carriage having a plurality of longitudinally extending article supporting sections for horizontal movement towards and away from a selected hatchway access location, said article supporting sections including a central longitudinally extending portion for article support, horizontal carriage supporting rails in said car, carriage supporting members movable along said rails, a motor on said carriage, spaced article impelling members mounted on said carriage on opposite sides of said central article engaging portion for moving an article along said article engaging portion, carriage moving members on said carriage and said car having interengaging portions, and operating connections between said motor and said carriage moving members and said motor and said article impelling members, said operating connections between said motor and said article impelling member and between said motor and said carriage moving members including a belt, a pulley with which said belt is in driving engagement, a pinion mounted in said carriage driven by said pulley, and a rack on said car with which said pinion is in engagement.

10. In combination with a car adapted for movement in a vertical hatchway having hatchway doors at hatchway access locations movable to open positions, an article transfer carriage having a plurality of longitudinally extending article supporting sections for movement towards and away from a selected hatchway access location, said article supporting sections including a central longitudinally extending article engaging portion for article support, horizontal carriage supporting rails in said car, carriage supporting members movable along said rails, a motor on said carriage, spaced article pusher devices mounted on said carriage on opposite sides of said central article engaging portion for moving an article along said carriage, carriage moving members on said carriage and said car having interengaging portions and operating connections between said motor and said carriage moving members and said motor and said article pusher devices, said operating connections including a belt, a first pulley, with which said belt is in driving engagement, a pinion mounted on said carriage and driven by said first pulley, a rack on said car with which said pinion is in engagement, a second pulley with which said belt is in driving engagement, pairs of spaced sprockets on said carriage, chains on said sprockets, and a driving connection between said second pulley and one of said sprockets of each pair, each of said article pusher devices being carried by one of said chains.

References Cited by the Examiner

UNITED STATES PATENTS

| | | | |
|---|---|---|---|
| Re. 24,963 | 4/1961 | Carroll. | |
| 1,828,307 | 10/1931 | Been. | |
| 2,370,381 | 2/1945 | Vaughan ____________ | 214—95 |

FOREIGN PATENTS

| | | |
|---|---|---|
| 225,864 | 6/1958 | Australia. |
| 231,910 | 6/1959 | Australia. |
| 203,958 | 6/1959 | Austria. |
| 833,174 | 3/1952 | Germany. |

GERALD M. FORLENZA, *Primary Examiner.*

MORRIS TEMIN, *Examiner.*